United States Patent
Obi et al.

(10) Patent No.: US 8,686,058 B2
(45) Date of Patent: Apr. 1, 2014

(54) NATURAL RESOURCE BASED VISCOELASTIC FOAMS

(75) Inventors: Bernard E. Obi, Pearland, TX (US); Alan K. Schrock, Lake Jackson, TX (US); Rogelio R. Gamboa, Brazoria, TX (US); Asjad Shafi, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 271 days.

(21) Appl. No.: 13/054,709

(22) PCT Filed: Jul. 15, 2009

(86) PCT No.: PCT/US2009/050734
§ 371 (c)(1),
(2), (4) Date: Jan. 18, 2011

(87) PCT Pub. No.: WO2010/009256
PCT Pub. Date: Jan. 21, 2010

(65) Prior Publication Data
US 2011/0124762 A1    May 26, 2011

Related U.S. Application Data

(60) Provisional application No. 61/081,996, filed on Jul. 18, 2008.

(51) Int. Cl.
*C08G 18/28* (2006.01)

(52) U.S. Cl.
USPC ............ 521/173; 521/130; 521/174; 521/176

(58) Field of Classification Search
USPC .................. 521/130, 174, 173, 176
See application file for complete search history.

(56) References Cited

U.S. PATENT DOCUMENTS

| | | | |
|---|---|---|---|
| 4,534,907 A | 8/1985 | Peerman et al. | |
| 4,640,801 A | 2/1987 | Simone et al. | |
| 5,521,226 A * | 5/1996 | Bleys | 521/174 |
| 6,107,433 A | 8/2000 | Petrovic et al. | |
| 6,121,398 A | 9/2000 | Wool et al. | |
| 6,512,024 B1 | 1/2003 | Lundgard et al. | |
| 6,891,053 B2 | 5/2005 | Chasar et al. | |
| 6,897,283 B2 | 5/2005 | Gerber et al. | |
| 6,962,636 B2 | 11/2005 | Kurth et al. | |
| 6,979,477 B2 | 12/2005 | Kurth et al. | |
| 2006/0167125 A1 | 7/2006 | Bauer et al. | |
| 2006/0276609 A1 | 12/2006 | Lysenko et al. | |
| 2006/0293400 A1 * | 12/2006 | Wiltz, Jr. et al. | 521/172 |
| 2007/0179210 A1 | 8/2007 | Swaniker | |

FOREIGN PATENT DOCUMENTS

| | | |
|---|---|---|
| DE | 19936481 A1 | 2/2001 |
| EP | 1845121 A1 | 7/2009 |
| JP | 1994211958 | 8/1994 |
| WO | WO-2004/096744 | 11/2004 |
| WO | WO-2004/096882 | 11/2004 |
| WO | WO-2004/096883 | 11/2004 |
| WO | WO-2007/111828 A2 | 10/2007 |
| WO | WO-2008/021034 A2 | 2/2008 |

OTHER PUBLICATIONS

Akay et al, Transition broadening and WLF relationship in polyurethane/poly(methyl methacrylate) interpenetrating polymer networks. Polymer. 1993, p. 967-71, 34(5).
Kageoka et al, Less tempaerature-sensitive LR slabstock foam. Conference Proceedings—Polyurethanes Expo, Columbus, OH, United States, Sep. 30-Oct. 3, 2001, p. 403-407.
Karabanova et al, Heterogeneity of glass transition dynamics in polyurethane-poly(2-hydroxyethyl methacrylate) semi-interpenetrating polymer networks. Journal of Polymer Science, Part B: Polymer Physics, 2007, p. 963-975, 45(8).
Lunardon et al, Production of soft block foams and TDI-based cold cure-molded foams with no use of chlorofluorocarbons (CFCs). Proceedings of the SPI Annual Technical.Marketing Conference 1989, 32nd (Polyurethanes 89), p. 239-45.
PU Magazine, vol. 5, No. 6, Dec. 2008, p. 368-372.
Sartor et al, Thermal history and enthalpy relaxation of an interpenetrating network polymer with exceptionally broad relaxation time distribution. Jornal of Polymer Science, Part B, Polymer Physics, 1994, p. 683-9, 32(4).
Smiecinski et al, Reduction of chlorofluorocarbon requirements in prodcution of flexible polyurethane slabstock foams. Journal of Cellular Plastics, 1989.
Walker et al, Extended IFD range polyols for low density, soft and supersoft flexible foams requiring reduced auxiliary blowing agent. Proceedings of the SPI Annual Technical/Marketing Conference, 1989, 32nd (Polyurethanes 89), p. 251-4.
PCT/US2009/050734 International Preliminary Report on Patentability, (2009).
PCT/US2009/050734 International Search Report, (2009).
PCT/US2009/050734 Written Opinion, (2009).

* cited by examiner

*Primary Examiner* — John Cooney

(57) ABSTRACT

Embodiments of the present invention disclose viscoelastic foams having a renewable natural resource contents of between about 1 and about 25 wt % of the foam. The foams may have a ratio of elastic modulus (E') at 20° C. to 25% compression force deflection (CFD) of 25 to 125.

12 Claims, No Drawings

NATURAL RESOURCE BASED VISCOELASTIC FOAMS

CROSS-REFERENCE TO RELATED APPLICATIONS

This application claims benefit of U.S. Provisional Patent Application Ser. No. 61/081,996, filed Jul. 18, 2008, entitled "Natural Resource Based Viscoelastic Foams" which is herein incorporated by reference.

BACKGROUND OF THE INVENTION

Embodiments of the present invention generally relates to viscoelastic polyurethane foam, and methods for preparing those foams. More particularly, the embodiments relate to such viscoelastic foams which include components based on renewable natural resources.

Polyurethane foams are used in a wide variety of applications, ranging from cushioning (such as mattresses, pillows and seat cushions) to packaging to thermal insulation and for medical applications. Polyurethanes have the ability to be tailored to particular applications through the selection of the raw materials that are used to form the polymer. Rigid types of polyurethane foams are used as appliance insulation foams and other thermal insulating applications. Semi-rigid polyurethanes are used in automotive applications such as dashboards and steering wheels. More flexible polyurethane foams are used in cushioning applications, notably furniture, bedding and automotive seating.

One class of polyurethane foam is known as viscoelastic (VE) or "memory" foam. Viscoelastic foams exhibit a time-delayed and rate-dependent response to an applied stress. They have low resiliency and recover slowly when compressed. These properties are often associated with the glass transition temperature ($T_g$) of the polyurethane. Viscoelasticity is often manifested when the polymer has a $T_g$ at or near the use temperature, which is room temperature for many applications.

Like most polyurethane foams, VE polyurethane foams are prepared by the reaction of a polyol component with a polyisocyanate, in the presence of a blowing agent. The blowing agent is usually water or, less preferably, a mixture of water and another material. VE formulations are often characterized by the selection of polyol component and the amount of water in the formulation. The predominant polyol used in these formulations has a functionality of about 3 hydroxyl groups/molecule and a molecular weight in the range of 400-1500. This polyol is primarily the principal determinant of the $T_g$ of the polyurethane foam, although other factors such as water levels and isocyanate index also play significant roles.

Typically viscoelastic polyurethane foams have low air flow properties, generally less than about 1.0 standard cubic feet per minute (scfm) (0.47 l/s) under conditions of room temperature (22° C.) and atmospheric pressure (1 atm), therefore promote sweating when used as comfort foams (for instance, bedding, seating and other cushioning). Low airflow also leads to low heat and moisture conduction out of the foam resulting in (1) increased foam (bed) temperature and (2) moisture level. The consequence of higher temperature is higher resiliency and lowered viscoelastic character. Combined heat and moisture result in accelerated fatigue of the foam. In addition, if foam air flows are sufficiently low, foams can suffer from shrinkage during manufacturing. Furthermore, improving the support factor of viscoelastic foams is limited unless viscoelastic properties are compromised. These disadvantages are sometimes addressed by addition of copolymer polyols such as those containing styrene/acrylonitrile (SAN).

It would be desirable to achieve a higher air flow value than is generally now achieved while retaining viscoelastic properties of the foam. It would also be desirable to have foams with good air flow while improving the support factor. In some applications, it is also desirable to have foams which feel soft to the touch. Furthermore, it would be desirable to achieve these properties in foams that include components based on renewable natural resources

SUMMARY OF THE INVENTION

Embodiments of the present include an open cell structures, viscoelastic foams incorporating such structures, reaction systems and methods and for producing such foams.

One embodiment provides a viscoelastic foam having a ratio of elastic modulus (E') at 20° C. to 25% compression force deflection (CFD) of 25 to 125, wherein the foam has a renewable resource content of between about 1% and about 25 wt % of the foam.

In a further embodiment the inventions provides for a polyol composition comprising:
  a1) from 30 to 80 weight percent of at least one polyoxypropylene or a polyoxyethylene-polyoxypropylene polyol,
    having an average equivalent weight between 100 and 2000
    and an average nominal hydroxy functionality of 2-4, with the proviso if the polyol is a polyoxyethylene-polyoxypropylene polyol, the polyoxypropylene content is at least 70% by weight of the polyol;
  a2) from 5 to 50 weight percent of a polyoxyethylene or a polyoxyethylene-polyoxypropylene polyol,
    having an average equivalent weight between 100 and 1000;
    and an average nominal hydroxy functionality of 2-4, with the proviso if the polyol is a polyoxyethylene-polyoxypropylene polyol, the polyoxyethylene content is at least 70% by weight of the polyol; and
  a3) from 1 to 40 wt % of at least one isocyanate reactive compound derived from a renewable natural resource.

In yet another embodiment the invention provides for reaction system for the preparation of a viscoelastic polyurethane foam, comprising:
  a) a polyol composition as disclosed above;
  b) a polyisocyanate composition;
  c) from 0.5 to 3.5 wt % of water based on the total weight of a)
  and optionally d) additives and auxiliaries known per se.

In yet another embodiment the invention provides a process for preparing a viscoelastic polyurethane foam, comprising
  A) forming a reaction mixture including at least
    a) an isocyanate reactive component comprising the polyol composition disclosed above;
    b) at least one polyisocyanate,
    c) water in an amount of 0.5 to 3.5 weight percent of a), and
    d) optional additives and auxiliaries known per se; and
  B) subjecting the reaction mixture to conditions sufficient to cause the reaction mixture to expand and cure to form a viscoelastic polyurethane foam.

DETAILED DESCRIPTION OF THE INVENTION

As used herein, term "viscoelastic foam" is intended to designate those foams having a resilience of less than 25%, as measured according to ASTM D3574 Test H. Preferably the foam will have a resilience of less than 20%. If further embodiments the foam will have a resilience of less than 15% or even less than 10%. In certain embodiments the foams have a resiliency of 5% or less and even less than 3%.

As used herein, the term "viscoelasticity" is the time dependent response of a material to an applied constant load (stress) due to the co-existence of elastic (solid) and viscous (liquid) characteristics in the material. In dynamic mechanical characterization, the level of viscoelasticity is proportional to the damping coefficient measured by the tan delta of the material. The tan delta is the ratio of the viscous dissipative loss modulus E" to the Young's elastic modulus E'. High tan delta values imply that there is a high viscous component in the material behavior and hence a strong damping to any perturbation will be observed. E' and tan delta are determined dynamic mechanical thermal analysis (DMTA). DMTA herein is measured using a TA Instruments RSA III Rheometer with the cylindrical tension/compression geometry fixture. The test type is a Dynamic Temperature Ramp method with an initial temperature of −115.0° C. and a final temperature of 250.0° C. at a ramp rate of 3.0° C./min. The E' to 25% CFD's are normalized to densities.

Glass transition temperature" (Tg) is the temperature point corresponding to the peak value of the tan delta curve in a dynamic mechanical thermal analysis (DMTA) measurement. The elastic modulus E', loss modulus E", and the ratio of loss modulus to elastic modulus E"/E' known as the loss tangent or tan delta are measured versus temperature. The temperature corresponding to the peak of the tan delta curve is taken as the glass transition temperature (Tg) of the specimen tested.

As used herein, the term "support factor" refers to the ratio of 65% Compression (Indentation) Force Deflection (CFD) divided by 25% Compression Force Deflection. The term "Compression Force Deflection" refers to a measure of the load bearing capacity of a flexible material (for instance, foam) measured as the force (in pounds) (converted to kPa) required to compress a four inch (10 cm) thick sample no smaller than 24 inches square (155 cm$^2$), to 25 or 65 percent of the sample's initial height as indicated by the terms 25% CFD and 65% CFD, respectively.

The foams of the present invention generally have an air flow of 2 scfm or greater. In another embodiment, the air flow of the foam is greater than 2.3 scfm. Due to practical consideration to have a foam with sufficient support, the foam generally has an air flow of less than 8 scfm. In a further embodiment the foam has an air flow of 7 scfm or less. In a further embodiment, the foam will have an air flow from 2.3 scfm to 6.25 scfm.

The foams having a soft feel while maintaining good elastic modulus can be represented by the ratio of the elastic modulus (measured at 20° C.) to the 25% CFD. Viscoelastic foams of the present invention will have a elastic modulus to 25% CFD ratio of 25 or greater. Preferably the ratio will be 30 or greater. In a further embodiment, the ratio is 35 or greater. The ratio will generally be 125 or less. In some embodiments the ratio may be 115 or less. In yet other embodiments, the ratio will be 110 or less.

The foams of the present invention exhibit a tan delta of greater than 0.3 over the temperature range of 0 to 40° C. In further embodiments the tan delta is 0.4 or greater over the temperature range of 0 to 40° C., particularly 0.4 or greater over the temperature range of 18 to 40° C.

The cured VE foam advantageously has a density in the range of 2.5 to 30 pounds/cubic foot (pcf) 40-480 kg/m$^3$), preferably the density is 3.0 pounds/cubic foot (48 kg/m$^3$) or greater. Preferably the density is up to 20 lb/ft$^3$ 320 kg/m$^3$). In a further embodiment, the density is 10 lb/ft$^3$ 160 kg/m$^3$) or less. Density is conveniently measured according to ASTM D 3574-01 Test A.

In one embodiment of the invention the viscoelastic foam is a reaction product of a reaction system where the reaction system includes an isocyanate component and isocyanate-reactive component. The isocyanate-reactive component used in polyurethane production are generally those compounds having at least two hydroxyl groups or amine groups. Those compounds are referred to herein as polyols. In one embodiment the polyols are polyether polyols which contain reactive hydroxyl groups.

The polyether polyols include those obtained by the alkoxylation of suitable starting molecules (initiators) with an alkylene oxide. Examples of initiator molecules having 2 to 4 reactive sites include water, ammonia, or polyhydric alcohols such as dihydric alcohols having a molecular weight of 62-399, especially the alkane polyols such as ethylene glycol, propylene glycol, hexamethylene diol, glycerol, trimethylol propane or trimethylol ethane, or low molecular weight alcohols containing ether groups such as diethylene glycol, triethylene glycol, dipropylene glycol, tripropylene glycol or butylene glycols. These polyols are conventional materials prepared by conventional methods. Catalysis for this polymerization can be either anionic or cationic, with catalysts such as KOH, CsOH, boron trifluoride, or a double cyanide complex (DMC) catalyst such as zinc hexacyanocobaltate or quaternary phosphazenium compound. In the case of alkaline catalysts, these alkaline catalysts are preferably removed from the polyol at the end of production by a proper finishing step, such as coalescence, magnesium silicate separation or acid neutralization.

In an embodiment of the present invention, the isocyanate-reactive component is a polyol composition comprising:
  a1) from 30 to 80 weight percent of at least one polyoxypropylene or a polyoxyethylene-polyoxypropylene polyol,
    having a number average equivalent weight between 100 and 2000
    and a number average nominal hydroxy functionality of 2-4,
    with the proviso if the polyol is a polyoxyethylene-polyoxypropylene polyol, the polyoxypropylene content is at least 70% by weight of the polyol;
  a2) from 5 to 50 weight percent of a polyoxyethylene or a polyoxyethylene-polyoxypropylene polyol,
    having a number average equivalent weight between 100 and 1000;
    and a number average nominal hydroxy functionality of 2-4,
    with the proviso if the polyol is a polyoxyethylene-polyoxypropylene polyol, the polyoxyethylene content is at least 70% by weight of the polyol; and
  a3) from 10 to 40 wt % of at least one isocyanate reactive compound derived from a renewable natural resource.

The polyoxypropylene based polyol a1) will generally contain greater than 70% by weight of oxyalkylene units derived from propylene oxide (PO) units and preferably at least 75% by weight of oxyalkylene units derived from PO. In other embodiments the polyol will contain greater than 80 wt % of oxyalkylene units derived from PO and in a further embodiment, 85 wt % or more of the oxyalkylene units will be derived from PO. In some embodiments, propylene oxide will be the sole alkylene oxide used in the production of the polyol. When ethylene oxide (EO) is used in the production of polyol a1), it is preferred the EO is fed as a co-feed with the PO or feed as an internal block.

The polyol component a1) in further embodiments will comprise 35 wt %, 40 wt % 45 wt % of the total polyol composition. The polyol component a1) may comprise 60 wt %, 65 wt %, 70 wt % and even up to 80 wt % of the total polyol.

In a further embodiment, polyol a1) will comprise two separate components; at least one polyol having a number average equivalent weight of less than 700 (designated a1a) and at least one second polyol having an equivalent weight of 700 or greater (designated a1b). The polyol components a1a) and a1b) may independently contain weight percents derived from PO as described above for polyol a1).

When two separate polyols a1a) and a1b) are used, the polyol component a1a) will generally comprise at least 5 wt %, 10 wt % or at least 15 wt % of the total polyol composition a). Polyol component a1a) may comprise at least 50 wt %, 55 wt %, 60 wt % and even up to 79 wt % of the total polyol. The equivalent weight of polyol a1a) will generally be from 100 to less than 700 and preferably from 150 to 650. In other embodiments, the equivalent weight is from 200 to 650.

When both polyols a1a) and a1b) are present, polyol a1b) will generally comprise at least 1 wt %, at least 3 wt % or at least 5 wt % of the total polyol. Polyol a1b) will generally comprise less than 25 wt %, preferably less than 20 wt % or even less than 17 wt % of the total polyol present. The equivalent weight of polyol a1b) is from 700 to 2000. Preferably the equivalent weight of polyol a1b) is from 750 to 1750. In a further embodiment, the equivalent weight of polyol a1b) is from 800 to 1450. In another embodiment the equivalent weight of polyol a1b) is less than 1250.

Polyol a2) is a polyoxyethylene based polyol containing greater than 70% by weight of oxyethylene units, preferably at least 75% oxyethylene units, more preferably at least 80% oxyethylene units, still in further embodiment at least 90%, and even at least 93% oxyethylene units by weight. In some embodiments, a2) is essentially free of oxyalkylene units other than oxyethylene units. Polyol a2) generally has a nominal functionality of bound hydroxyl groups of 2 to 4, preferably 2 to 3, and in some embodiments a nominal functionality of 3.

The number averaged equivalent weight of a2) relative to the combined total of hydroxyl groups in the polyol, is from 100 to 1000; from 150 to 825; from 175 to 750, and in some embodiments from 190 to 500, and even from 200 to less than 500.

The polyol component a2) in further embodiments may comprise at least 10 wt %, 14 wt %, or 17 wt % of the total polyol composition. The polyol component a2) may comprise less than 44 wt %, 40 wt %, 35 wt % or less than 30 wt % of the total polyol.

Component a3) of the polyol composition is at least one isocyanate reactive compound derived from a renewable natural resource. Component a3) may be a natural oil based polyol.

The natural oil based polyols are polyols based on or derived from renewable feedstock resources such as natural and/or genetically modified (GMO) plant vegetable seed oils and/or animal source fats. Such oils and/or fats are generally comprised of triglycerides, that is, fatty acids linked together with glycerol. Such vegetable oils may have at least about 70 percent unsaturated fatty acids in the triglyceride. The natural product may contain at least about 85 percent by weight unsaturated fatty acids. Examples of vegetable oils include those from castor, soybean, olive, peanut, rapeseed, corn, sesame, cotton, canola, safflower, linseed, palm, grapeseed, black caraway, pumpkin kernel, borage seed, wood germ, apricot kernel, pistachio, almond, macadamia nut, avocado, sea buckthorn, hemp, hazelnut, evening primrose, wild rose, thistle, walnut, sunflower, jatropha seed oils, or a combination thereof. Additionally, oils obtained from organisms such as algae may also be used. Examples of animal products include lard, beef tallow, fish oils and mixtures thereof. A combination of vegetable and animal based oils/fats may also be used.

For use in the production of polyurethane foams, the natural material may be modified to give the material isocyanate reactive groups or to increase the number of isocyanate reactive groups on the material. Preferably such reactive groups are a hydroxyl group. Several chemistries can be used to prepare the natural oil based polyols. Such modifications of a renewable resource include, for example, epoxidation, hydroxylation, ozonolysis, esterification, hydroformylation, or alkoxylation. Such modifications are commonly known in the art and are described, for example, in U.S. Pat. Nos. 4,534,907, 4,640,801, 6,107,433, 6,121,398, 6,897,283, 6,891,053, 6,962,636, 6,979,477, and PCT publication Nos. WO 2004/020497, WO 2004/096744, and WO 2004/096882.

After the production of such polyols by modification of the natural oils, the modified products may be further alkoxylated. The use of ethylene oxide (EO) or mixtures of EO with other oxides, introduce hydrophilic moieties into the polyol. In one embodiment, the modified product undergoes alkoxylation with sufficient EO to produce a natural oil based polyol with between about 10 weight % and about 60 weight % percent EO; preferably between about 20 weight % and about 40 weight % EO.

In another embodiment, the natural oil based polyols are obtained by a multi-step process wherein the animal or vegetable oils/fats is subjected to transesterification and the constituent fatty acids recovered. This step is followed by hydroformylating carbon-carbon double bonds in the constituent fatty acids to form hydroxymethyl groups, and then forming a polyester or polyether/polyester by reaction of the hydroxymethylated fatty acid with an appropriate initiator compound. Such a multi-step process is commonly known in the art, and is described, for example, in PCT publication Nos. WO 2004/096882 and 2004/096883. The multi-step process results in the production of a polyol with both hydrophobic and hydrophilic moieties, which results in enhanced miscibility with both water and conventional petroleum-based polyols.

The initiator for use in the multi-step process for the production of the natural oil based polyols may be any initiator used in the production of conventional petroleum-based polyols. Preferably the initiator is selected from the group consisting of neopentylglycol; 1,2-propylene glycol; trimethylolpropane; pentaerythritol; sorbitol; sucrose; glycerol; diethanolamine; alkanediols such as 1,6-hexanediol, 1,4-butanediol; 1,4-cyclohexane diol; 2,5-hexanediol; ethylene glycol; diethylene glycol, triethylene glycol; bis-3-aminopropyl methylamine; ethylene diamine; diethylene triamine; 9(1)-hydroxymethyloctadecanol, 1,4-bishydroxymethylcyclohexane; 8,8-bis(hydroxymethyl)tricyclo[$5,2,1,0^{2,6}$]decene; Dimerol alcohol (36 carbon diol available from Henkel Corporation); hydrogenated bisphenol; 9,9(10,10)-bishydroxymethyloctadecanol; 1,2,6-hexanetriol and combination thereof. More preferably the initiator is selected from the group consisting of glycerol; ethylene glycol; 1,2-propylene glycol; trimethylolpropane; ethylene diamine; pentaerythritol; diethylene triamine; sorbitol; sucrose; or any of the aforementioned where at least one of the alcohol or amine groups present therein has been reacted with ethylene oxide, propylene oxide or mixture thereof; and combination thereof. More preferably, the initiator is glycerol, trimethylopropane, pentaerythritol, sucrose, sorbitol, and/or mixture thereof.

The at least one isocyanate reactive compound derived from a renewable natural resource may in another embodiment include at least one hydroxymethylated fatty acid or ester thereof. To for such hydroxymethylated fatty acids or methyl esters thereof, the animal or vegetable oils/fats described above, is subjected to transesterification and the constituent fatty acid esters recovered. This step is followed by hydroformylating the carbon-carbon double bonds in the constituent fatty acid esters and then hydrogenating to form hydroxymethyl groups. Either the hydroxymethylated fatty acid or the corresponding hydroxymethylated fatty acid ester may be used. In one embodiment the hydroxymethylated fatty acid methyl ester is used. In another embodiment, 9(10)-hydroxymethylstearate (prepared by hydroformylating and reducing methyl oleate) may be used.

The at least one isocyanate reactive compound derived from a renewable natural resource may in another embodiment include at least one polymerized hydroxymethylated fatty acid or ester thereof. For example, the polymerized hydroxymethylated fatty acid or ester thereof may be derived from Methyl 9(10)-hydroxy methylstearate which readily loses methanol and forms a trimeric polymer.

The component a3) in further embodiments may comprise at least 1 wt %, 5 wt %, 10 wt %, 15 wt %, 20 wt %, or 25 wt % of the total polyol composition. The component a3) may comprise less than 40 wt %, 35 wt %, 30 wt % or less than 25 wt % of the total polyol.

Component b) is an organic polyisocyanate having an average of 1.8 or more isocyanate groups per molecule. The isocyanate functionality is preferably from about 1.9 to 4, and more preferably from 1.9 to 3.5 and especially from 1.9 to 2.5. Suitable polyisocyanates include aromatic, aliphatic and cycloaliphatic polyisocyanates. Aromatic polyisocyanates are generally preferred based on cost, availability and properties imparted to the product polyurethane. Exemplary polyisocyanates include, for example, m-phenylene diisocyanate, 2,4- and/or 2,6-toluene diisocyanate (TDI), the various isomers of diphenylmethanediisocyanate (MDI), hexamethylene-1,6-diisocyanate, tetramethylene-1,4-diisocyanate, cyclohexane-1,4-diisocyanate, hexahydrotoluene diisocyanate, hydrogenated MDI ($H_{12}$ MDI), naphthylene-1,5-diisocyanate, methoxyphenyl-2,4-diisocyanate, 4,4'-biphenylene diisocyanate, 3,3'-dimethoxy-4,4'-biphenyl diisocyanate, 3,3'-dimethyldiphenylmethane-4,4'-diisocyanate, 4,4',4"-triphenylmethane tri-isocyanate, polymethylene polyphenylisocyanates, hydrogenated polymethylene polyphenylisocyanates, toluene-2,4,6-triisocyanate, and 4,4'-dimethyl diphenylmethane-2,2',5,5'-tetraisocyanate. Preferred polyisocyanates include MDI and derivatives of MDI such as biuret-modified "liquid" MDI products and polymeric MDI, as well as mixtures of the 2,4- and 2,6-isomers of TDI.

A polyisocyanate of particular interest is a mixture of 2,4- and 2,6-toluene diisocyanate containing at least 60% by weight of the 2,4-isomer. In another embodiment, the polyisocyanate is a mixture of 2,4- and 2,6-toluene diisocyanate containing at about 80% by weight of the 2,4-isomers. These polyisocyanate mixtures are widely available and are relatively inexpensive, yet have heretofore been difficult to use in commercial scale VE foam processes due to difficulties in processing the foam formulation.

In a further embodiment polyisocyanate has a number average functionality of isocyanate groups of greater than 2.1 and consists predominantly, on a weight bases, of one or more polyisocyanates of the MDI series.

The amount of polyisocyanate that is used typically is sufficient to provide an isocyanate index of from 70 to 115. In another the index is from 85 to 110 and in a further embodiment from 85 to 105. The isocyanate index is the equivalents of isocyanate, divided by the total equivalents of isocyanate-reactive hydrogen containing materials, multiplied by 100.

The foam formulation includes water, in an amount from about 0.5 to about 3.5 parts per 100 parts by weight of the polyol or polyol mixture. The invention is of particular interest in formulations in which the water content is from about 0.8 to about 2.5 parts, especially from 1.0 to 2.25 parts, and in a further embodiment from 0.8 to 1.8 parts, by weight per 100 parts by weight polyol.

The reaction system may optionally contain minor amounts of up to 10% by weight of the total reaction system (but typically zero or up to less than 5 wt %) of reactive (polymer forming) species, not including any chain extenders, cross linkers or reactive fillers as described herein, other than those specified above. These may include, for example, species containing primary and/or secondary amines, polyester polyols or polyols different than those described above.

A wide variety of materials are known to catalyze polyurethane forming reactions, including tertiary amines; tertiary phosphines such as trialkylphosphines and dialkylbenzylphosphines; various metal chelates such as those which can be obtained from acetylacetone, benzoylacetone, trifluoroacetyl acetone, ethyl acetoacetate and the like, with metals such as Be, Mg, Zn, Cd, Pd, Ti, Zr, Sn, As, Bi, Cr, Mo, Mn, Fe, Co and Ni; acid metal salts of strong acids, such as ferric chloride, stannic chloride, stannous chloride, antimony trichloride, bismuth nitrate and bismuth chloride; strong bases such as alkali and alkaline earth metal hydroxides, alkoxides and phenoxides, various metal alcoholates and phenolates such as Ti(OR)4, Sn(OR)4 and Al(OR)3, wherein R is alkyl or aryl, and the reaction products of the alcoholates with carboxylic acids, beta-diketones and 2-(N,N-dialkylamino) alcohols; alkaline earth metal, Bi, Pb, Sn or Al carboxylate salts; and tetravalent tin compounds, and tri- or pentavalent bismuth, antimony or arsenic compounds. Preferred catalysts include tertiary amine catalysts and organotin catalysts. Examples of commercially available tertiary amine catalysts include: trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl)ether, triethylenediamine and dimethylalkylamines where the alkyl group contains from 4 to 18 carbon atoms. Mixtures of these tertiary amine catalysts are often used. Examples of commercially available amine catalysts include Niax™ A1 and Niax™ A99 (bis (dimethylaminoethyl)ether in propylene glycol available from GE Advanced Materials, Silicones), Niax™ B9 (N,N-dimethylpiperazine and N—N-dimethylhexadecylamine in a polyalkylene oxide polyol, available from GE Advanced Materials, Silicones), Dabco™ 8264 (a mixture of bis(dimethylaminoethyl)ether, triethylenediamine and dimethylhydroxyethyl amine in dipropylene glycol, available from Air Products and Chemicals), and Dabco™ 33LV (triethylene diamine in dipropylene glycol, available from Air Products and Chemicals), Niax™ A-400 (a proprietary tertiary amine/carboxylic salt and bis(2-dimethylaminoethy)ether in water and a proprietary hydroxyl compound, available from GE Advanced Materials, Silicones); Niax™ A-300 (a proprietary tertiary amine/carboxylic salt and triethylenediamine in water, available from GE Advanced Materials, Silicones); Polycat™ 58 (a proprietary amine catalyst available from Air Products and Chemicals), Polycat™ 5 (pentamethyl diethylene triamine, available from Air Products and Chemicals) and Polycat™ 8 (N,N-dimethyl cyclohexylamine, available from Air Products and Chemicals).

Examples of organotin catalysts are stannic chloride, stannous chloride, stannous octoate, stannous oleate, dimethyltin dilaurate, dibutyltin dilaurate, other organotin compounds of the formula SnRn(OR)4-n, wherein R is alkyl or aryl and n is 0-2, and the like. Organotin catalysts are generally used in conjunction with one or more tertiary amine catalysts, if used at all. Commercially available organotin catalysts of interest include Dabco™ T-9 and T-95 catalysts (both stannous octoate compositions available from Air Products and Chemicals).

Catalysts are typically used in small amounts, for example, each catalyst being employed from about 0.0015 to about 5% by weight of the natural oil derived polyol composition. The amount depends on the catalyst or mixture of catalysts, the desired balance of the gelling and blowing reactions for specific equipment, the reactivity of the polyols and isocyanate as well as other factors familiar to those skilled in the art.

In a further embodiment, to improve processing and to permit the use of higher isocyanate indices, additives e) such as those described in publication WO 20008/021034, the disclosure of which is incorporated herein by reference, may be added to the reaction mixture. Such additive include
1) alkali metal or transition metal salts of carboxylic acids;
2) 1,3,5-tris alkyl- or 1,3,5-tris (N,N-dialkyl amino alkyl)-hexahydro-s-triazine compounds; and
3) carboxylate salts of quaternary ammonium compounds.

When used, such additives are generally used in an amount from about 0.01 to 1 part per 100 parts by weight of component a).

The component e) additive is generally dissolved in at least one other component of the reaction mixture. It is generally not preferred to dissolve it in the polyisocyanate.

Various additional components may be included in the viscoelastic foam formulation. These include, for example, chain extenders, crosslinkers, surfactants, plasticizers, fillers, plasticizers, smoke suppressants, fragrances, reinforcements, dyes, colorants, pigments, preservatives, odor masks, physical blowing agents, chemical blowing agents, flame retardants, internal mold release agents, biocides, antioxidants, UV stabilizers, antistatic agents, thixotropic agents, adhesion promoters, cell openers, and combination of these.

The foamable composition may contain a cell opener, chain extender or crosslinker. When these materials used, they are typically used in small quantities such as up to 10 parts, especially up to 2 parts, by weight per 100 parts by weight polyol or polyol mixture. A chain extender is a material having two isocyanate-reactive groups/molecule, whereas a crosslinker contains on average greater than two isocyanate-reactive groups/molecule. In either case, the equivalent weight per isocyanate-reactive group can range from about 30 to less than 100, and is generally from 30 to 75. The isocyanate-reactive groups are preferably aliphatic alcohol, primary amine or secondary amine groups, with aliphatic alcohol groups being particularly preferred. Examples of chain extenders and crosslinkers include alkylene glycols such as ethylene glycol, 1,2- or 1,3-propylene glycol, 1,4-butanediol, 1,6-hexanediol, and the like; glycol ethers such as diethylene glycol.

A surfactant may be included in the viscoelastic foam formulation to help stabilize the foam as it expands and cures. Examples of surfactants include nonionic surfactants and wetting agents such as those prepared by the sequential addition of propylene oxide and then ethylene oxide to propylene glycol, solid or liquid organosilicones, and polyethylene glycol ethers of long chain alcohols. Ionic surfactants such as tertiary amine or alkanolamine salts of long chain alkyl acid sulfate esters, alkyl sulfonic esters and alkyl arylsulfonic acids may also be used. The surfactants prepared by the sequential addition of propylene oxide and then ethylene oxide to propylene glycol are preferred, as are the solid or liquid organosilicones. Examples of useful organosilicone surfactants include commercially available polysiloxane/polyether copolymers such as Tegostab (trademark of Goldschmidt Chemical Corp.) B-8462 and B-8404, and DC-198 and DC-5043 surfactants, available from Dow Corning, and Niax™ 627 surfactant from OSi Specialties.

When a surfactant is used, it is typically present in an amount of 0.0015 to 1 part by weight per 100 parts by weight polyol or polyol mixture.

One or more fillers may also be present in the viscoelastic foam formulation. A filler may help modify the composition's rheological properties in a beneficial way, reduce cost and impart beneficial physical properties to the foam. Suitable fillers include particulate inorganic and organic materials that are stable and do not melt at the temperatures encountered during the polyurethane-forming reaction. Examples of suitable fillers include kaolin, montmorillonite, calcium carbonate, mica, wollastonite, talc, high-melting thermoplastics, glass, fly ash, carbon black titanium dioxide, iron oxide, chromium oxide, azo/diazo dyes, phthalocyanines, dioxazines and the like. The filler may impart thixotropic properties to the foamable polyurethane composition. Fumed silica is an example of such a filler.

Reactive particles may also be included in the reaction system to modify the properties of the viscoelastic foam. Such reactive systems include copolymer polyols such as those containing styrene/acrylonitrile (SAN), polyharnstoff dispersion (PHD) polyols and polyisocyanate polyaddition products (PIPA), for instance as taught in Chemistry and Technology of Polyols for Polyurethanes, Rapra Technology Limited (2005) pp 185-227.

When used, fillers advantageously constitute from about 0.5 to about 30%, especially about 0.5 to about 10%, by weight of the composition.

Although no additional blowing agent (other than the water) in the foamable polyurethane composition is generally used, it is within the scope of the invention to include an additional physical or chemical blowing agent. Among the physical blowing agents are supercritical $CO_2$ and various hydrocarbons, fluorocarbons, hydrofluorocarbons, chlorocarbons (such as methylene chloride), chlorofluorocarbons and hydrochlorofluorocarbons. Chemical blowing agents are materials that decompose or react (other than with isocyanate groups) at elevated temperatures to produce carbon dioxide and/or nitrogen.

The VE foam can be prepared in a so-called slabstock process, or by various molding processes. In a slabstock process, the components are mixed and poured into a trough or other region where the formulation reacts, expands freely in at least one direction, and cures. Slabstock processes are generally operated continuously at commercial scales.

In a slabstock process, the various components are introduced individually or in various subcombinations into a mixing head, where they are mixed and dispensed. Component temperatures are generally in the range of from 15 to 35° C. prior to mixing. The dispensed mixture typically expands and cures without applied heat. In the slabstock process, the reacting mixture expands freely or under minimal restraint (such as may be applied due to the weight of a cover sheet or film).

It is also possible to produce the viscoelastic foam in a molding process, by introducing the reaction mixture into a closed mold where it expands and cures.

Viscoelastic foam made in accordance with the invention are useful in a variety of packaging and cushioning applications, such as mattresses, including mattress toppers, pillows, packaging, bumper pads, sport and medical equipment, helmet liners, pilot seats, earplugs, and various noise and vibration dampening applications. The noise and vibration dampening applications are of particular importance for the transportation industry, such as in automotive applications.

In one embodiment, the foam may have a renewable resource content of at least 1 wt %, 2 wt %, 5 wt %, 7 wt %, 10 wt %, 15 wt %, 18 wt %, 20 wt %, or 25 wt % of the foam. The foam may have a renewable resource content less than 40 wt %, 35 wt %, 33 wt %, 30 wt %, 27 wt %, 25 wt %, 23 wt %, or 20 wt of the foam. The renewable resource content may be determined by the ASTM D6866 standard (Standard Test Methods for Determining the Biobased Content of Natural Range Materials Using Radiocarbon and Isotope Ratio Mass Spectrometry Analysis) or calculated as described in PU Magazine, Vol. 5, No. 6, December 2008, pages 368-372.

EXAMPLES

The following examples are provided to illustrate the embodiments of the invention, but are not intended to limit the scope thereof. All parts and percentages are by weight unless otherwise indicated.

The following materials were used:

Polyol A is a 3 functional, 336 equivalent weight all propylene oxide polyether polyol commercially available from The Dow Chemical Company under the trade designation VORANOL™ 3150.

Polyol B is a 6.9 functional, 1800 approximate equivalent weight random copolymer of ethylene oxide and propylene oxide commercially available from The Dow Chemical Company under the trade designation VORANOL™ 4053 polyol.

Polyol C is a three functional; all ethylene oxide feed polyol, with an EW of approximately 208.

Polyol D is a glycerin initiated polyoxyethylene-polyoxypropylene mixed fed polyol (8 wt % EO) having an equivalent weight of approximately 994 available from The Dow Chemical Company under the trade designation VORANOL™ 3010 polyol.

Diol A is a 2.0-functional natural oil polyol prepared using hydroxymethylated fatty acid methyl ester monomers with an average of 1.0 hydroxyls per fatty acid derived from soy oil in its natural abundance yielding a distribution of about 27% weight percent saturated monomer, about 40% weight percent mono-hydroxy monomer, and about 33% weight percent di-hydroxyl monomer. Diol A is made by reacting the hydroxymethylated soybean fatty acid methyl ester monomers with an approximately 50/50% weight mixture of 1,3-cyclohexane dimethanol and 1,4-cyclohexane dimethanol, using 650 ppm stannous octoate (commercially available from City Chemical Co.) as the catalyst. The resulting polyester has a viscosity of approximately 4000 cP at 25° C., a hydroxyl equivalent weight of 1000, Mn of 2000. Diol-A has an average of approximately 2.0 hydroxyl groups/molecule.

Surfactant A is an organosilicone surfactant sold commercially by OSi Specialties as NIAX L-627 surfactant.

Tin Catalyst A is a stannous octoate catalyst available commercially from Air Products and Chemicals as DABCO T-9 catalyst.

Amine catalyst A is a 70% bis-dimethylaminoethyl ether solution in dipropylene glycol, commercially supplied as DABCO BL11 catalyst by Air Products and Chemicals, Inc.

Amine catalyst B is a 33% solution of triethylene diamine in dipropylene glycol, available commercially from Air Products and Chemicals as DABCO 33LV.

TDI is an 80/20 blend of the 2,4- and 2,6-isomers of toluene diisocyanate available as VORANATE™ T-80 from The Dow Chemical Company.

Test Methods

Unless otherwise specified, the foam properties are measured by ASTM 3574-05.

Examples 1 and 2 and Control (C1).

The foams are prepared by first blending the polyols, water, and amine catalysts in a high shear rate mix head. Component temperatures are approximately 22° C. This mixture is then blended in the same manner with the surfactant and tin catalyst, and the resulting mixture then blended, again in the same manner, with the polyisocyanate. The final blend is immediately poured into an open box and allowed to react without applied heat. Total formulation weights are 2000-2700 grams. Formulations used for producing polyurethane foam are given in Table 1. Example C1 is a control foam based on a formulation for production of a viscoelastic foam. The cured formulations are aged for a minimum of seven days and taken for property testing. The properties of the produced foams are given in Table 1.

The data shows foams based the present invention have good air flow and low compression force deflection 25%. The foam of the present inventions also have a good support factor, showing better support when compared to a standard formulation at the same index.

TABLE 1

|  | Control C1 | Example 1 | Example 2 |
|---|---|---|---|
| Polyol A | 95 | 60.9 | 49 |
| Polyol B | 5 | | |
| Polyol C | | 25 | 22 |
| Polyol D | | 11.1 | 9 |
| Diol A | | 3 | 20 |
| H2O | 1.25 | 1.25 | 1.25 |
| Surfactant A | 0.9 | 0.9 | 0.9 |
| Amine Catalyst A | 0.15 | 0.15 | 0.15 |
| Amine Catalyst B | 0.30 | 0.18 | 0.20 |
| Tin Catalyst A | 0.03 | 0 | 0 |
| Total | 102.63 | 102.48 | 102.50 |
| ISOCYANATE INDEX | 90 | 85 | 90 |
| TDI | 33.26 | 33.62 | 32.77 |
| Total Mass | 135.89 | 136.10 | 135.27 |
| Tensile Strength (psi) | 5.42 | 1.02 | 1.31 |
| % Elongation | 121 | 70 | 62 |
| Tear Strength (pli) | 0.71 | 0.17 | 0.19 |
| Air Flow (scfm) | 0.37 | 4.22 | 2.49 |
| Density (pcf) | 4.04 | 5.43 | 5.01 |
| Recovery Time (Sec) | 3 | 20 | 300 |
| CFD Load @ 25% (lbf) | 2.64 | 0.69 | 0.84 |
| CFD Load @ 65% (lbf) | 6.36 | 2.70 | 3.99 |
| CFD Load @ 75% (lbf) | 12.02 | 5.39 | 9.03 |
| Support Factor | 2.40 | 3.92 | 4.74 |
| Average Resiliency (%) | 6.6 | 3.6 | 8.0 |
| Compression Set 75% (%) | 2.2 | 5.2 | 13.2 |
| Compression Set 90% (%) | 2.6 | 5.4 | 10.7 |
| CFD 25% (psi) | 0.165 | 0.043 | 0.053 |
| E' @ 20° C. (psi) | 1.77 | 1.25 | 0.89 |
| Normalized E' @ 20° C. (psi/pcf) | 3014 | 1583 | 1230 |
| E' (psi)/CFD 25% (psi) | 11 | 29 | 17 |

What is claimed is:

1. A process for preparing a viscoelastic polyurethane foam, comprising:
   A) forming a reaction mixture including:
      a) an isocyanate reactive component comprising a polyol composition of:
         a1) from 30 to 80 wt % of a combination of a polyoxypropylene based polyol and a polyoxyethylene-polyoxypropylene polyol that is different from the polyoxypropylene based polyol, each of the polyoxypropylene based polyol and the polyoxyethylene-polyoxypropylene polyol having an average nominal hydroxyl functionality of 2-4 and an average equivalent weight between 100 and 2000, the polyoxypropylene based polyol having a polyoxypropylene content of at least 85 wt % based on a total weight of the polyoxypropylene based polyol, and the polyoxyethylene-polyoxypropylene polyol having a polyoxypropylene content of at least 70 wt % based on a total weight of the polyoxyethylene-polyoxypropylene polyol;
         a2) from 5 to 50 wt % of a polyoxyethylene containing polyol having an average nominal hydroxyl functionality of 2-4 and an average equivalent weight between 100 and 1000, the polyoxyethylene containing polyol having an average nominal hydroxyl functionality of 2-4 and an average equivalent weight between 100 and 1000, the polyoxyethylene containing polyol having a polyoxyethylene content of at least 70 wt % based on a total weight of the polyoxyethylene containing polyol; and
         a3) from 1 to 40 wt % of at least one isocyanate reactive compound derived from a renewable natural resource;
      b) a polyisocyanate component,
      c) water in an amount of 0.5 to 3.5 weight percent of a), and
      d) optional additives and auxiliaries; and
   B) subjecting the reaction mixture to conditions sufficient to cause the reaction mixture to expand and cure to form a viscoelastic polyurethane foam having a resiliency of less than 20% as measured according to the ATSM D-3574-H ball rebound test.

2. The process of claim 1, wherein the viscoelastic polyurethane foam is formed to have an air flow as measured by ASTM D-3574 Test G that is greater than 2 scfm.

3. The process of claim 2, wherein the viscoelastic polyurethane foam is formed to have an air flow of 2.25 to 6 scfm, as measured by ASTM D-3574 Test G.

4. The process of claim 1, wherein the viscoelastic polyurethane foam is formed to have a tan delta greater than 0.3 over the temperature range of 0 to 40° C.

5. The process of claim 1, wherein the viscoelastic polyurethane foam is formed to have a density of 1 lb/ft$^3$ to 30 lb/ft$^3$.

6. The process of claim 1, wherein the viscoelastic polyurethane foam is formed to have a density of at least 2 lb/ft$^3$.

7. The process of claim 1, wherein the resiliency is less than 10% as measured according to the ATSM D-3574-H ball rebound test.

8. The process of claim 1, wherein the at least one isocyanate reactive compound includes at least one of a hydroxymethylated fatty acid and a hydroxymethylated ester.

9. The process of claim 1, wherein the equivalent weight of one of the polyoxypropylene based polyol and the polyoxyethylene-polyoxypropylene polyol of a1) is from 200 to 700, and the equivalent weight of the other is greater than 700.

10. The process of claim 1 wherein a total polyoxypropylene content in the reaction mixture based on a1) and a2) is at least 75 wt %.

11. The process of claim 1 wherein the polyisocyanate component includes a blend of toluene diisocyanate 2,4- and 2,6-isomers.

12. The process of claim 1 wherein the polyisocyanate component has a number average functionality of isocyanate groups of greater than 2.1 and consists predominantly, on a weight bases, of one or more polyisocyanates of diphenylmethane diisocyanate series.

* * * * *